United States Patent [19]

Wickham et al.

[11] Patent Number: 4,552,410
[45] Date of Patent: Nov. 12, 1985

[54] BRAKING SYSTEMS FOR RAILWAY

[75] Inventors: David J. Wickham; Raymond A. S. Wilkins, both of Chippenham; Edmund J. Page, London, all of England

[73] Assignee: Westinghouse Brake & Signal Co., Wiltshire, England

[21] Appl. No.: 542,536

[22] Filed: Oct. 17, 1983

[30] Foreign Application Priority Data

Nov. 6, 1982 [GB] United Kingdom ............... 8231753
Nov. 15, 1982 [GB] United Kingdom ............... 8232604

[51] Int. Cl.⁴ .............................................. B60T 8/20
[52] U.S. Cl. .................................. 303/23 R; 188/195
[58] Field of Search ............ 188/195, 349; 303/22 R, 303/23 R, 23 A, 22 A, 56

[56] References Cited

U.S. PATENT DOCUMENTS

| 671,911 | 4/1901 | Sauvage | 303/22 R |
| 2,155,226 | 4/1939 | Renshaw | 303/22 R |
| 3,338,638 | 8/1967 | Kirk et al. | 303/22 R |
| 4,445,725 | 5/1984 | Sivulka | 188/195 |
| 4,453,778 | 6/1984 | Smith et al. | 188/195 |

Primary Examiner—Duane A. Reger
Assistant Examiner—Alvin Oberley
Attorney, Agent, or Firm—Larson and Taylor

[57] ABSTRACT

An empty-load railway vehicle braking system wherein the piston-and-cylinder of the empty-load valve operates against the rack of a rack-and-pinion arrangement of which the pinion is drivingly connected to an arresting member the position of which is determined by the loading of the vehicle.

6 Claims, 4 Drawing Figures

BRAKING SYSTEMS FOR RAILWAY

This invention relates to braking systems for railway vehicles having a body carried by a spring bogie.

Such systems are known which incorporate an empty-load valve operable by empty-load measuring means carried by one of the sprung or unsprung parts of the vehicle and a stop carried by the other of the sprung or unsprung parts. In some such systems the measuring means include a piston-and-cylinder arrangement which is extended by pressurisation of the arrangement upon the making of a brake application, to bring an arresting member of the means into engagement with the stop. The permitted travel of the arresting member before it engages the stop is indicative of the vehicle being loaded or otherwise and controls the operation of the empty-load valve to determine a degree of braking dependent upon the vehicle being either loaded or empty.

The operating situation of the empty-load measuring means is particularly onerous due to the complexity of the movement of the body relative to the bogie whilst the vehicle is travelling, the lack of height available and the damage to which the means is susceptible both from dirt and ice (in winter conditions) and flying stones thrown up by travel of the vehicle. The present invention seeks to provide an equipment more suited to such a situation than known equipment.

The present invention therefore provides a braking system for a railway vehicle having a body carried by a sprung bogie, the system including an empty-load valve operable by empty-load measuring means carried by one of the body and the bogie of the vehicle and a stop carried by the other of the body and the bogie, the measuring means including a piston-and-cylinder arrangement extended by pressurisation of the arrangement upon the making of a brake application to bring an arresting member into engagement with the stop, characterised in that the piston-and-cylinder arrangement is operatively connected to a rack drivingly engaged with a pinion itself drivingly connected to the arresting member such that extension of the arrangement, through the rack, rotates the pinion to allow the arresting member to move into engagement with the stop and thereby determine the permitted degree of rotation of the pinion, the empty-load valve being operable in accordance with the permitted degree of rotation of the pinion either to permit a higher level of brake application upon lesser movement of the arresting member before it engages the stop or a lower level of brake application upon greater movement of the arresting member before it engages the stop.

The arresting member may be connected to one end of a reynolds chain the other end of which is engaged with the teeth of a cog wheel drivenly connected to the pinion or may be an arm drivingly connected to the pinion. The arresting member may be loaded by a spring in a direction urging the member into engagement with the stop, rotation of the pinion by extension of the piston-and-cylinder arrangement merely permitting the member to be moved by the spring to engage the stop.

In an alternative, the connection of the arresting member to the pinion may be by bowden cable.

The empty-load valve may be a poppet valve openable by a valve stem to connect the brake cylinder to a volume, the valve stem having therethrough a passage which opens the volume to atmosphere when the stem is disengaged from the poppet valve. The valve stem may be operable to engage the poppet valve and thereby unseat it from its seat, by a cam surface drivenly connected to the pinion. A degree of lost motion may be provided between the pinion and the cam surface.

Embodiments of the present invention will now be described in greater detail, by way of example only, with reference to the accompanying drawings of which:

The railway vehicle on which the system is provided comprises, in the well-known manner, a vehicle body mounted on a sprung bogie. As is also well known, it is desirable that a higher braking effort be applied to the vehicle when it is loaded than when it is empty and, to this end, as with vehicles provided with such a facility of load dependent braking, an empty-load measuring means is carried, more usually, by the body. This means has an arresting member engageable with a stop, more usually carried by the bogie. The distance which the arresting member can travel before engaging the stop will clearly vary with the load of the vehicle as the body of the vehicle sinks on the springs of the bogie with its loading.

Figure 1:
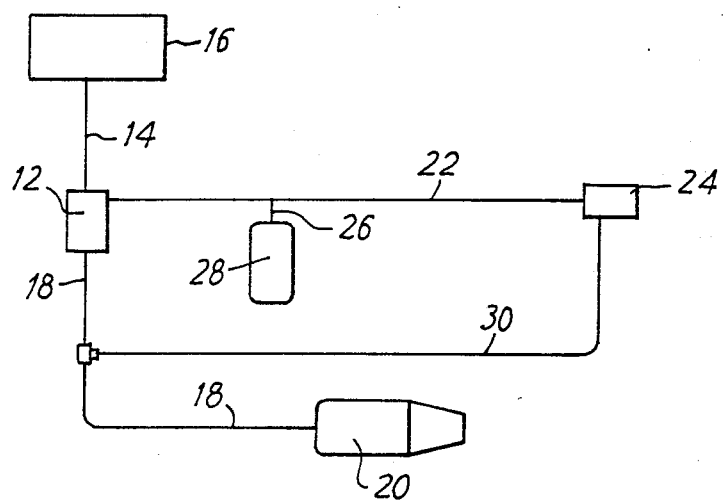
FIG. 1 is a schematic view of the system.

Referring now to FIG. 1, the braking system, in outline, comprises a brake valve 16 operable over the conventional brake pipe (not shown) to produce on line 14 a pressure indicative of the required degree of braking of the vehicle. The line 14 is connected to a proportional valve 12 of conventional operation whereby either the pressure on line 14 is transmitted unaltered through the valve 12 to line 18 or it is reduced by the valve 12. The output (whichever it be) of the valve 12 is applied over line 18 to the brake cylinder 20 and also, over line 30, to an empty-load valve 24. The valve 24 is connected over line 22 both direct to the proportional valve 12 and, over line 26, to a fixed volume 28.

Figure 2:
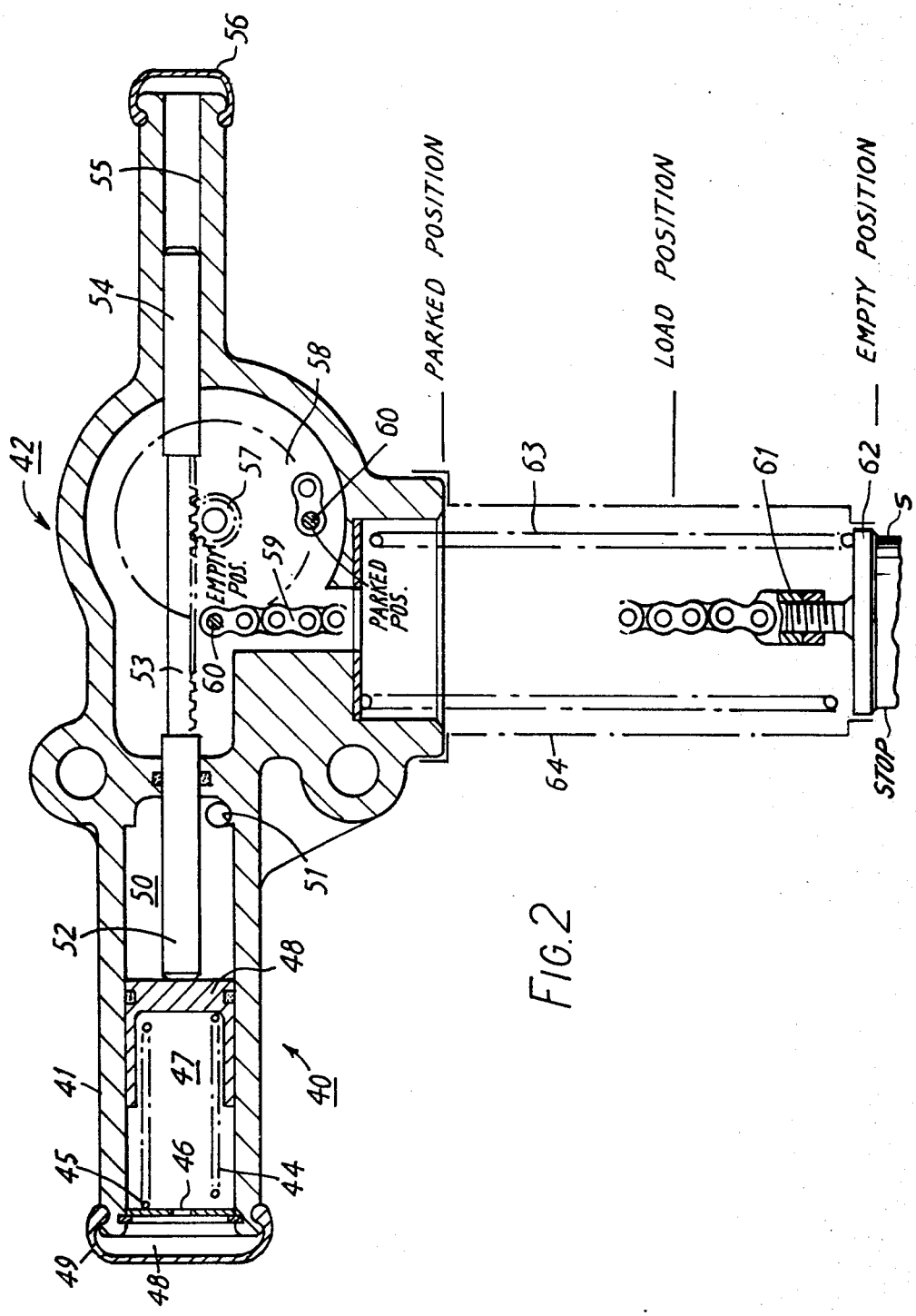
FIG. 2 is longitudinal cross-section of the empty-load measuring means.

The empty-load valve 12 is operated by the empty-load measuring means shown in FIG. 2. This means comprises a piston-and-cylinder arrangement 40 of which the cylinder 41 is integral with the housing 42 of the means. The piston 43 of the arrangement 40 is urged towards the right (as viewed in the drawing) by a spring 44 of which one end abuts the rear of the piston 43 and the other an end plate 45 perforated at 46 to connect the chamber 47 behind the piston 43 to a variable-volume chamber 48 defined by the end plate 45 and a porous end-cap 49.

The sealed chamber 50 in front of the piston 43 has an inlet passage 51 to which is connected the line 30.

Abutting the front of the piston 43 is a piston rod 52 the mid-portion of which forms a rack 53 and the right hand end of which (as viewed in the drawing) constitutes a second piston 54 slidable within a second cylinder 55 formed within the housing 42. The cylinder 55 is sealed at its outer end by a porous end cap 56 similar to the cap 49.

The rack 53 is engaged with a complementary pinion 57 solid with which is a cog-wheel 58. The peripheral cogs of the cog-wheel 58 engage a reynolds chain 59 which partially wraps around the cog wheel 58 and one end 60 of which is secured to the cog wheel 58 and the other 61 to an arresting member 62. Exterior of the housing 42, the chain 59 is encircled by a spring 63 extending between the housing 42 and the member 62. This spring 63 acts in a direction to urge the member 62 downwardly (as viewed in the drawing) towards engagement with a stop, indicated schematically at S, carried by the sprung bogie of the vehicle in the well-known manner.

The spring 63 and chain 61 (when external of the housing 42) is enclosed in a rubber boot 64 to minimise the intrusion of dirt.

The empty-load valve 24 is mounted (see FIG. 3) integral with the empty-load measuring means. This valve 70 is of the poppet-valve type having a valve-closure element 71 resiliently engaged by a spring 72 with valve seat 73 positioned between ports 74 and 75. The port 74 is connected to line 30 and port 75 to line 22. The valve-closure element 71 can be moved off of its seat 73 by a valve stem 76 which has therethrough a bore 77 connecting the second valve seat 78 at the end of the stem 76 adjacent the element 71 to atmosphere.

Figure 3:
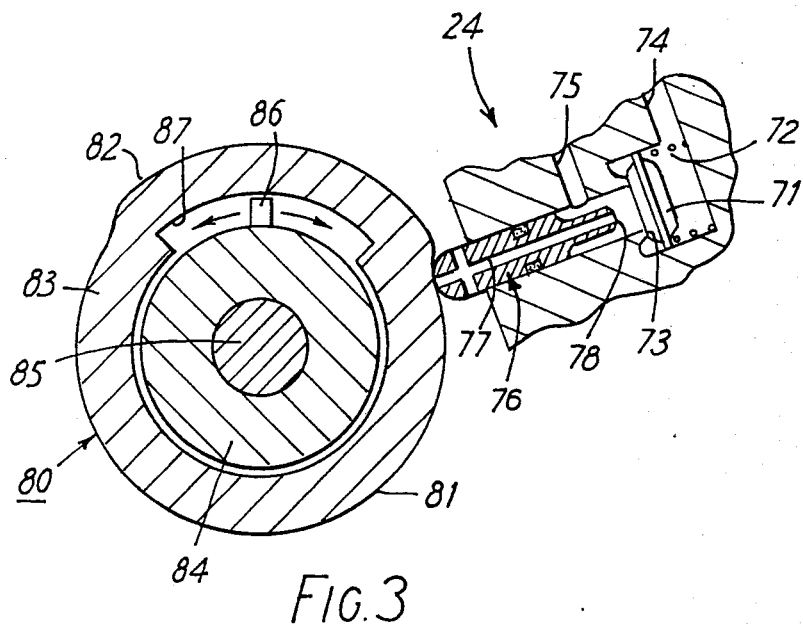
FIG. 3 is a cross-sectional view of the empty-load valve.

The cam surface 80 has two portions 81 and 82. Whilst the valve stem 76 engages the portion 81, the valve 70 remains in its condition as shown in FIG. 3. When the cam surface 80 is rotated to bring the stem 76 into engagement with the portion 81, the valve stem 76 lifts the valve closure element 71 off of its valve seat 73 and thus interconnect the ports 74 and 75 and close the valve seat 73 thereby disconnecting the port 75 from its connection to atmosphere.

The cam surface 80 is carried on the periphery of a tubular part 83 surrounding a disc 84 fixed to a shaft 85 which carries also the pinion 57 and cog-wheel 58 of the empty-load measuring means of FIG. 2. This disc 84 has a radial peg 86 which rides in a segmental internal groove 87 in the part 83. This peg and groove 86/87 provides "lost motion" between the disc 84 and the part 83. This "lost motion" will accommodate any movement between the vehicle body and the bogie whilst it is travelling and which is unwanted from the point of view of load measurement.

The system and equipment above described operates as follows:

Assume that no brake application is being made. In this condition there will be no pressure in line 14 which will be vented to atmosphere through the brake valve 16 in the normal manner. There will also, therefore, be no pressure in the chamber 50 so that the piston 43 will be driven to the right (as viewed in FIG. 2) by the spring 44 carrying with it the rack 53 of the piston rod 52. Such movement of the rack 53 will rotate the pinion 57 clockwise carrying with it the cog-wheel 58. As the cog wheel rotates, it will "wind-up" the chain 59 lifting the member 62 against spring 63 until it is in the "parked position" indicated in FIG. 2.

Equally, there will also be no pressure at port 74.

Also, the empty-load valve 24 of FIG. 3 will be in the condition shown in that Figure.

Assume now that the vehicle is in a "loaded" condition and that a brake application is made.

Now a pressure will appear on line 14 which is indicative of the required degree of braking—this being determined in the known manner by the output of brake valve 16 being applied to line 14, this output being itself determined by the drop in brake pipe pressure applied to the valve 16. The pressure in line 14 passes through the proportional valve 12 to line 18 whence it flows both to the brake cylinder 20 and to the empty-load valve 24 at port 74. The pressure also appears at inlet port 51 of the piston-and-cylinder arrangement 40. This pressure overcomes the effect of the spring 44 in that arrangement and drives the piston 43 to the left (as viewed in FIG. 2). As the piston 43 so moves, the piston rod 52 will follow it under the action of spring 63 now being freed to move the arresting member 62 downwardly thereby, through chain 61 rotating the cog-wheel 58 and the pinion 57 counterclockwise thus driving the rack 53 leftward carrying with it the piston rod 52. Such movement of the member 62 (and, consequently, the pinion 57) will continue until the member 62 engages the stops carried by the bogie. Such engagement, because the vehicle is loaded, will occur at the "load position" marked in FIG. 2. Because the member 62 (and the pinion 57) can only move a lesser amount, the pinion 57 and the disc 84 will also only move a corresponding lesser amount in a counterclockwise direction (as viewed in FIG. 3) after the peg 86 has "picked-up" the tubular part 83. The cam surface 80 will, therefore, be rotated an insufficient amount to move the valve stem 76 off of the cam surface portion 81.

Hence, the valve 24 will remain in its condition shown in FIG. 3. In this condition, the valve closure element 71 will remain seated on its valve seat 73 and port 74 will be prevented from being connected to port 75 which will remain open to atmosphere through bore 77. Thus, no pressure will be applied to line 22 (FIG. 1) and the proportional valve 12 will remain in its condition in which whatever pressure appears on line 14 will pass unmodified through the valve 12 to appear on line 18 and, therefore, in brake cylinder 20.

When the brakes are released, all pressures are vented to atmosphere through valve 16, the brake cylinder 20 is exhausted to release the brakes and the chamber 50 (FIG. 3) is also exhausted to allow the empty-load measuring means to return to its "parked position" under the influence of spring 44.

Assume now that the vehicle is empty. In this condition it would be undesirable to allow the pressure appearing on line 14 when a brake application is made to appear in the brake cylinder 20.

When, now, pressure appears in line 14 as being indicative of a brake application being required, whilst this pressure initially builds up in the brake cylinder 20, it will also appear, again, at port 51 of the piston-and-cylinder arrangement 40 (FIG. 2). Again, the piston 43 will move to the left with the rack 53 following it exactly as before. However, in this empty condition of the vehicle, the rack 53 can move even further leftward than previously until the member 62 hits the stops at the lower "empty position" marked on FIG. 2. Thus, the pinion 57 will rotate in a counterclockwise direction further than it did previously with consequential further counterclockwise rotation of the cam surface 80. This time this movement will be sufficient for the valve stem 76 to ride up onto the portion 82 of the cam surface. This will force the valve stem 76 to engage the valve closure element 71 to close valve seat 78 at the end of the valve stem 76 and thus sever communications of port 75 with atmosphere and to unseat the element 71 from the valve seat 73 thus to connect port 74 with port 75. Pressure applied to port 74 over line 30 will now appear in line 22 connected to port 75.

Firstly, this pressure will be applied to the proportional valve 12 so that the pressure in line 14 is modified downwardly by valve 12 so that a lesser pressure appears on line 18 (and therefore, in brake cylinder 20) and, secondly, any "overshoot" of reduced pressure which may have occurred temporarily will be dissipated into the volume 28 now connected to line 18 through the empty-load valve 24.

Subsequent release of the brakes operates exactly as previously described.

Whilst the drive interconnecting the pinion 57 and the member 62 is above described as being a reynolds chain, it could equally well be a bowden cable.

Instead of the rubber boot 64, protection of the spring 63 and chain 59 (or bowden cable) could equally well be provided by a telescopic casing.

To provide transverse support for the spring 63 and chain 59 (or bowden cable), the arresting member 62 may be coupled to the housing 42 by a lazy-tongs arrangement.

Figure 4:
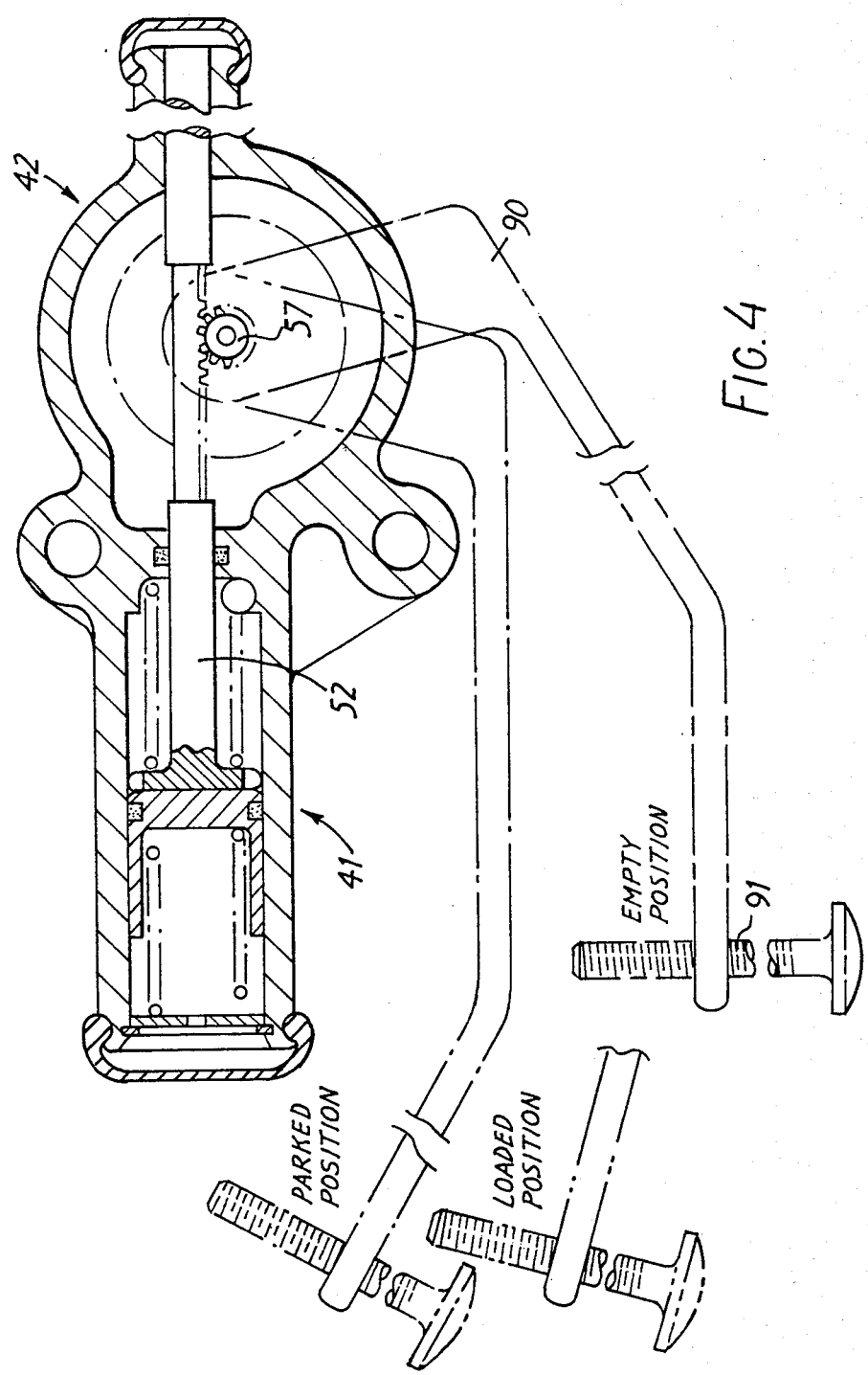
FIG. 4 is a longitudinal cross-sectional view similar to that of FIG. 2 of an alternative system.

Referring now to FIG. 4, in so far as the piston-and-cylinder arrangement 40, the housing 42, the piston rod 52 and the pinion 57 are all identical to the corresponding construction in FIG. 1, they need here no further description.

This embodiment differs from that previously-described embodiment only in that the pinion 57 carries an arm 90 the end of which remote from the pinion 57 carries an adjustable foot 91 which constitutes the arresting member. This embodiment operates in exactly the same manner as that described above with reference to FIGS. 1 to 3 and, therefore its operation requires no further description here.

I claim:

1. A braking system for a railway vehicle having a body carried by a sprung bogie, the system including an empty-load valve operable by empty-load measuring means carried by one of the body and the bogie of the vehicle and a stop carried by the other of the body and the bogie, the measuring means including a piston-and-cylinder arrangement extended by pressurization of the arrangement upon the making of a brake application to bring an arresting member into engagement with the stop, a pinion drivingly connected to the arresting member, a rack operatively connected to said piston-and-cylinder arrangement, and drivingly engaged with said pinion such that extension of the piston-and-cylinder arrangement, as transmitted through the rack, rotates the pinion to allow the arresting member to move into engagement with the stop and thereby determine the permitted degree of rotation of the pinion, the empty-load valve being operable in accordance with the permitted degree of rotation of the pinion either to permit a higher level of brake application upon lesser movement of the arresting member before the arresting member engages the stop or a lower level of brake application upon greater movement of the arresting member before the arresting member engages the stop.

2. A system as claimed in claim 1, wherein the arresting member is connected to one end of a reynolds chain the other end of which is engaged with the teeth of a cog wheel drivenly connected to the pinion.

3. A system as claimed in claim 1, wherein the arresting member comprises an arm drivingly connected to the pinion.

4. A system as claimed in claim 1, wherein the empty-load valve is a poppet valve openable by a valve stem to connect the brake cylinder to a means defining a volume, the valve stem having therethrough a passage which opens the volume defined by said volume defining means to atmosphere when the stem is disengaged from the poppet valve.

5. A system as claimed in claim 4, wherein the valve stem is operable to engage the poppet valve and thereby unseat the poppet valve from its seat, by a cam surface drivenly connected to the pinion.

6. A system as claimed in claim 5, wherein means for providing a degree of lost motion is provided between the pinion and the cam surface.

* * * * *